United States Patent
Gerszberg et al.

(10) Patent No.: US 7,924,813 B1
(45) Date of Patent: Apr. 12, 2011

(54) SYSTEM, DEVICE, AND METHOD FOR PROVIDING DATA TO A CALL PARTICIPANT

(75) Inventors: Irwin Gerszberg, Kendall Park, NJ (US); Scott J. Mollica, Red Bank, NJ (US); Farhad Barzegar, Branchburg, NJ (US); Thomas W. Hill, Succasunna, NJ (US)

(73) Assignee: A&T Intellectual Property II, LP, Atlanta, GA (US)

( * ) Notice: Subject to any disclaimer, the term of this patent is extended or adjusted under 35 U.S.C. 154(b) by 1680 days.

(21) Appl. No.: 10/992,460

(22) Filed: Nov. 18, 2004

(51) Int. Cl.
*H04L 12/56* (2006.01)

(52) U.S. Cl. .............. 370/352; 348/14.08; 370/227; 370/432; 370/486; 709/225; 709/227; 709/228; 709/250; 725/111; 726/2

(58) Field of Classification Search ............ 370/352, 370/468, 356, 260, 227, 432, 486; 375/242; 379/88.14, 93.05, 93.09, 142.08, 202.01, 379/265.09, 93.03; 434/118; 455/556.2; 704/270.1; 709/249, 219, 225, 227, 228, 709/250; 348/14.08; 725/111; 726/2
See application file for complete search history.

(56) References Cited

U.S. PATENT DOCUMENTS

| | | | | |
|---|---|---|---|---|
| 5,625,673 A * | 4/1997 | Grewe et al. | ............... | 455/556.2 |
| 5,764,736 A * | 6/1998 | Shachar et al. | ............. | 379/93.09 |
| 5,796,791 A * | 8/1998 | Polcyn | .................. | 379/265.09 |
| 5,954,799 A * | 9/1999 | Goheen et al. | ............... | 709/250 |
| 6,058,421 A * | 5/2000 | Fijolek et al. | ................. | 709/225 |
| 6,070,246 A * | 5/2000 | Beser | ............................... | 726/2 |
| 6,148,066 A * | 11/2000 | Di Santo et al. | ........... | 379/93.19 |
| 6,196,846 B1 * | 3/2001 | Berger et al. | ................. | 434/118 |
| 6,253,249 B1 * | 6/2001 | Belzile | .......................... | 709/249 |
| 6,292,781 B1 * | 9/2001 | Urs et al. | ..................... | 704/270.1 |
| 6,301,223 B1 * | 10/2001 | Hrastar et al. | ................ | 370/227 |
| 6,304,648 B1 * | 10/2001 | Chang | ...................... | 379/202.01 |
| 6,308,328 B1 * | 10/2001 | Bowcutt et al. | ............... | 725/111 |
| 6,331,987 B1 * | 12/2001 | Beser | ............................ | 370/486 |
| 6,351,773 B1 * | 2/2002 | Fijolek et al. | ................. | 709/228 |
| 6,373,936 B1 * | 4/2002 | Raniere et al. | ........... | 379/202.01 |
| 6,442,158 B1 * | 8/2002 | Beser | ............................ | 370/352 |
| 6,510,162 B1 * | 1/2003 | Fijolek et al. | ................. | 370/432 |
| 6,574,216 B1 * | 6/2003 | Farris et al. | .................. | 370/352 |
| 6,587,548 B2 * | 7/2003 | Brandenberger | .......... | 379/93.11 |
| 6,594,255 B1 | 7/2003 | Neuman | | |
| 6,611,868 B1 * | 8/2003 | Arutyunov | .................... | 709/227 |
| 6,658,096 B2 * | 12/2003 | Bremer et al. | ............. | 379/93.05 |
| 6,687,242 B1 | 2/2004 | Enzmann | | |
| 6,870,827 B1 * | 3/2005 | Voit et al. | ...................... | 370/352 |
| 7,031,394 B2 * | 4/2006 | Vitenberg | ..................... | 375/242 |
| 7,127,048 B2 * | 10/2006 | Bremer et al. | ............. | 379/93.09 |
| 7,162,454 B1 * | 1/2007 | Donner et al. | .................. | 705/64 |
| 7,164,756 B1 * | 1/2007 | Satapathy | ................... | 379/93.03 |
| 7,197,120 B2 * | 3/2007 | Luehrig et al. | ............. | 379/88.14 |
| 7,277,422 B2 * | 10/2007 | Bostrom et al. | .............. | 370/352 |
| 7,289,489 B1 * | 10/2007 | Kung et al. | .................. | 370/352 |
| 7,372,850 B1 * | 5/2008 | Chen et al. | .................. | 370/356 |
| 7,430,423 B1 * | 9/2008 | Falkner, Jr. | ................... | 455/466 |
| 7,701,883 B2 * | 4/2010 | Beckemeyer | ................ | 370/260 |

(Continued)

*Primary Examiner* — Gerald Gauthier

(74) *Attorney, Agent, or Firm* — Akerman Senterfitt; Michael K. Dixon

(57) ABSTRACT

Certain exemplary embodiments comprise a method comprising a plurality of activities, comprising: via a CPE telephony device simultaneously connectable to a POTS connection and to a connection to a data network: facilitating, via the POTS connection, a PSTN call, and facilitating, via the data network connection, a display of data to a call participant of the PSTN call, the data provided the data network.

23 Claims, 5 Drawing Sheets

U.S. PATENT DOCUMENTS

| | | |
|---|---|---|
| 2001/0031645 A1 | 10/2001 | Jarrett |
| 2001/0036174 A1* | 11/2001 | Herring .................. 370/352 |
| 2002/0168057 A1 | 11/2002 | Davis |
| 2003/0142662 A1* | 7/2003 | Mahajan .................. 370/352 |
| 2003/0210708 A1* | 11/2003 | Belotserkovsky ............ 370/468 |
| 2004/0090949 A1 | 5/2004 | So |
| 2004/0239754 A1* | 12/2004 | Shachar et al. ............ 348/14.08 |
| 2005/0069101 A1* | 3/2005 | Bear et al. .................. 379/88.17 |
| 2005/0254635 A1* | 11/2005 | Koretsky et al. ......... 379/142.08 |
| 2006/0045069 A1* | 3/2006 | Zehavi et al. ................ 370/352 |
| 2006/0080407 A1* | 4/2006 | Rengaraju .................... 709/219 |
| 2007/0110043 A1* | 5/2007 | Girard .......................... 370/352 |

* cited by examiner

SYSTEM, DEVICE, AND METHOD FOR PROVIDING DATA TO A CALL PARTICIPANT

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
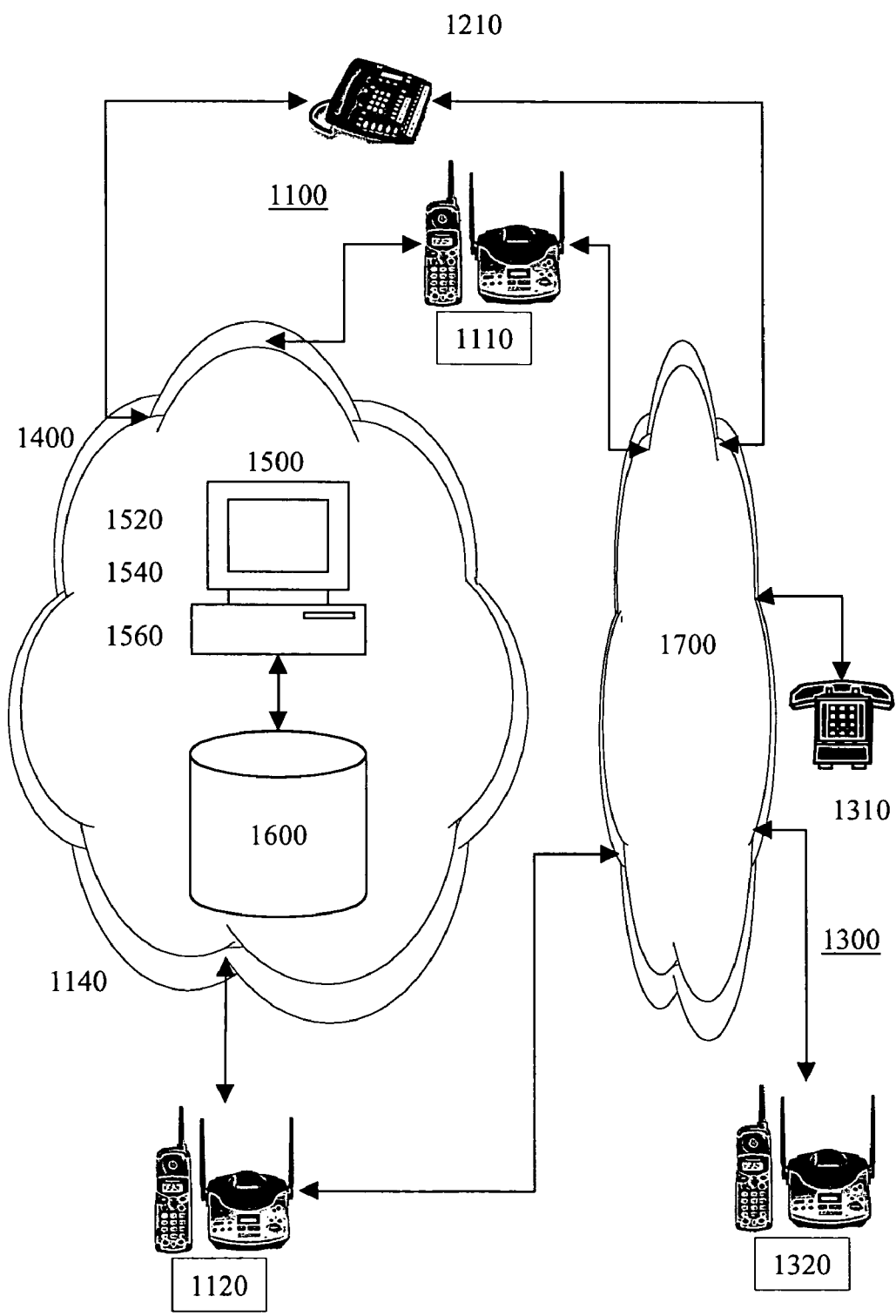
FIG. 1 is a block diagram of an exemplary embodiment of a system 1000.

When the following terms are used herein, the accompanying definitions apply:

adapted to—made suitable or fit for a specific use or situation.

apparatus—an appliance or device for a particular purpose base station—a fixed location, low-power two-way radio transceiver connected to the PSTN.

call—(n.) a voice communication via telephone.

can—is capable of, in at least some embodiments.

Cellular Radio System—a technique for mobile radio telephone wherein a service area is subdivided into a grid of small units (cells). Each cell has its own transmitter/receiver to service only that area. As the mobile user moves from cell to cell, the control of the land-line portion of the call is automatically passed to the next call facilities.

comprising—including but not limited to.

connectable—made suitable or fit for joining to or by means of a communications circuit.

connection—a tangible link.

corded—furnished with a cord for information transfer and only usable for information transfer via the cord.

cordless—comprising a handset and a base station that use low power radio signals to transfer information therebetween, the base station typically located no more than a few hundred yards away from the handset, the base station connected to the PSTN.

couplable—capable of being joined, connected, and/or linked together.

customer premises equipment (CPE)—telecommunications equipment that resides on the premises of a telecommunications user who is not a provider of telecommunications services.

data—distinct pieces of information, usually formatted in a special or predetermined way and/or organized to express concepts.

data network—a packet network. Examples include the Internet, which can use a protocol such as TCP/IP.

dedicated purposes—designed for the specific use and function of telephony and data rendering, and not designed as a general purpose computer and/or processor.

display—(v.) to visually render. (n.) an electronic device that represents information in visual form and/or a visual representation of something.

facilitate—to help bring about.

gateway—a device connected to a network for performing code and/or protocol conversion processes. An entrance and exit into a network.

handset—a mobile, low-power two-way radio transceiver that couples to a base station that is connected to the PSTN.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

input/output (I/O) device—the input/output (I/O) device of the information device can be any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

instructions—directions adapted to perform a particular operation or function.

link—a channel for communication.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

node—a communication device within a network that is coupled to another node within the network via a link. A CPE telephony device and/or gateway is not considered a node.

non-cellular—not utilizing the Cellular Radio System.

parameter—a variable and/or its value. Examples include a rate, measure, length, protocol, format, etc.

participant—someone who takes part in an activity.

Plain Old Telephone Service (POTS)—the basic analog voice service supplying standard single line telephones, telephone lines, and access to the public switched network. Excludes technologies such as ISDN, digital phones, cellular phones, and DSL.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can be a central processing unit, a local controller, a remote controller, parallel controllers, and/or distributed controllers, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

public switched telephone network (PSTN)—the world's interconnected voice-oriented system of telephone switches and lines used for providing telecommunication services to the general public.

receive—to take or acquire something provided.

resident—located, living, and/or operating within a particular place.

sample—to repeatedly measure, such as at discrete time intervals.

server—an information device and/or software that provides some service for other information devices connected to it via a network. A common example is a file server, which has a local disk and services requests from remote clients to read and write files on that disk. A server can also provide access to resources, such as programs, shared devices, etc.

Short Message Service (SMS)—a service for delivering text messages to a telephone.

simultaneously—happening, existing, or done at the same time.

substantially—to a great extent or degree.

system—a collection of mechanisms, devices, data, and/or instructions, the collection designed to perform one or more specific functions.

telecommunications—the science and technology of communication at a distance by electronic transmission of impulses.

telephone—an instrument that converts voice and other audio signals into a form that can be transmitted to remote locations and that receives and reconverts information from a transmittable form into voice and/or other audio signals.

telephony—the art or process of transmitting speech at a distance.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

via the data network connection—through at least one link coupling nodes comprised by a data network.

DETAILED DESCRIPTION

Typical POTS customer premises equipment (CPE) lack an ability to utilize network information services, such as data available on IP network servers, to directly benefit the CPE user. For example, various network data servers can provide displayable data regarding to directory assistance, weather, sports, stock quotes, news, vehicular traffic updates, photo exchange, chat, messaging, web browsing, advertisements, and/or games. Yet, because of their lack of adequate displays and IP network connectivity, this data typically has been unavailable to a POTS CPE, such as a corded or cordless telephone.

In certain novel approaches, a telephone is provided that comprises a display capable of displaying the desired information. The display can be color (e.g., approximately 4096 colors, 65,000 colors, etc.), of sufficient resolution to be legibly render the provided data (e.g., approximately 96×96, 128×128, 120×160, 176×220, 200×200 and/or 640×480 pixels, etc.), and/or be similar to that available on modern cellular telephones. The telephone can be corded or cordless, but is not a traditional cellular telephone or general purpose computer. Instead, the telephone is a dedicated telephony device that can comprise an integrated information retrieval and display capability.

The telephone can, but need not, utilize 802.11, WiFi, Bluetooth, UltraWideBand (UWB), or other "wireless" technology. If corded, the telephone can couple to an IP network (such as via an Ethernet, Home Phone Networking Alliance (HPNA), and/or Powerline Carrier interface connection) and to a PSTN, such as via a POTS connection. If cordless, the telephone can comprise a handset that is cordlessly couplable to a base station. The base station can couple to an IP network, such as via an Ethernet connection, and to a PSTN, such as via a POTS connection. The telephone can initiate a call to a called party coupled to a PSTN via a POTS connection.

Certain embodiments of the telephone can route voice and data traffic over an IP, ATM, and/or Frame Relay connection by utilizing Voice-Over-IP (VOIP) protocol, Voice over ATM (VoATM) protocol, Voice over Frame Relay (VoFR) protocol, Megaco H.248 (a Gateway Control Protocol), Media Gateway Control Protocol (MGCP), Remote Voice Protocol Over IP Specification (RVP over IP), Session Announcement Protocol (SAPv2), Session Description Protocol (SDP), Simple Gateway Control Protocol (SGCP), Session Initiation Protocol (SIP), Skinny Client Control Protocol (SCCP), Wireless Access Protocol (WAP), Wireless Markup Language (WML), Java, and/or Short Message Service (SMS), etc.

Certain embodiments of the telephone do not use the VOIP protocol, and instead route all voice traffic over a POTS connection, and all data traffic over an IP connection.

Thus, certain exemplary embodiments provide a method comprising a plurality of activities, comprising: via a CPE telephony device simultaneously connectable to a POTS connection and to a connection to a data network: facilitating, via the POTS connection, a PSTN call, and facilitating, via the data network connection, a display of data to a call participant of the PSTN call, the data provided the data network.

FIG. 1 is a block diagram of an exemplary embodiment of a system 1000, which can comprise any number of telephony devices 1100 comprising a display, such as display-comprising cordless telephones 1110, 1120 and/or display-comprising corded telephone 1210. System 1000 can also comprise any number of displayless telephone devices 1300, such as displayless corded telephone 1310 and displayless cordless telephone 1320.

Each displayless telephone 1300 can be coupled directly to a PSTN 1700 via a POTS connection.

Each display-comprising telephone 1100 can be coupled directly to a PSTN 1700 via a POTS connection, and to a data network 1400 via a data network connection.

Data network 1400 can comprise one or more network nodes 1500, such as a switch, softswitch, router, server, etc., any of which can be coupled to and/or integrate a database 1600. Any network node 1500 can be coupled to any network, such as a LAN, cellular telephone network, SMS network, etc. Any network node 1500 can comprise a user interface 1520 adapted to allow a network administrator to manage network node 1500. Any network node 1500 can comprise a server module 1540 adapted to respond to and/or initiate requests for data, files, and/or services, such as data services. Any network node 1500 can comprise a data provision module 1560 adapted to provide data from database 1600 in response to a valid request.

Figure 2:
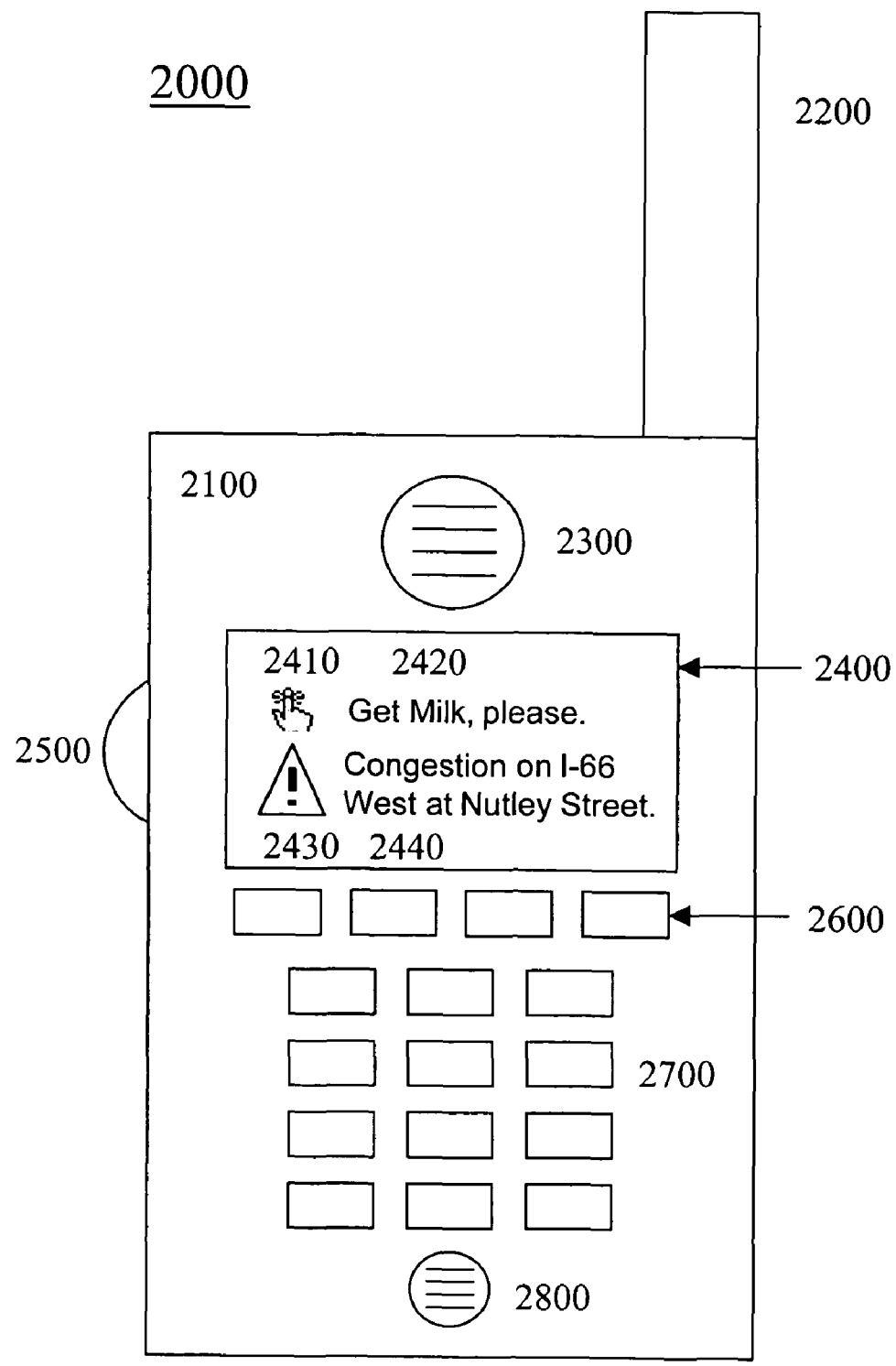
FIG. 2 is a block diagram of an exemplary embodiment of a telephony device 2000.

FIG. 2 is a block diagram of an exemplary embodiment of a display-comprising telephony device 2000, which can comprise an enclosure 2100, an antenna 2200 (if cordless), a speaker 2300, a display 2400, haptic input mechanisms 2500, 2600, 2700, and/or a microphone 2800, etc. Any of haptic input mechanisms 2500, 2600, 2700 can be a jog wheel, arrow pad, spring-loaded keys, keypad, touchpad, gesture entry system, etc., and can be used to enter a telephone number or other DTMF-actuated entries, request data, and/or provide other types of inputs, such as acknowledgements, selections, service requests, etc. Microphone 2800 can be used to create audio signals for a telephone conversation and/or provide input that is converted from speech to machine-recognized commands and/or data. In addition to generating an audible sound, such as speech received in a telephone conversation, speaker 2300 can enunciate data, requests, and/or commands.

Display 2400 can render one or more graphical data items 2410, 2420, and/or one or more textual data items 2420, 2440. For example, display 2400 can render a textual data item 2420 such as a reminder, e-mail message, instant message, chat message, etc. As another example, display 2400 can render a textual data item 2440 such as data regarding directory assistance, weather, sports, stock quotes, news, vehicular traffic updates, photo exchange, web browsing, advertisements, and/or games. As still another example, display 2400 can render a graphical data item 2410, 2430 such as an icon, sketch, drawing, illustration, chart, image, photograph, avatar, animation, video, etc.

Figure 3:
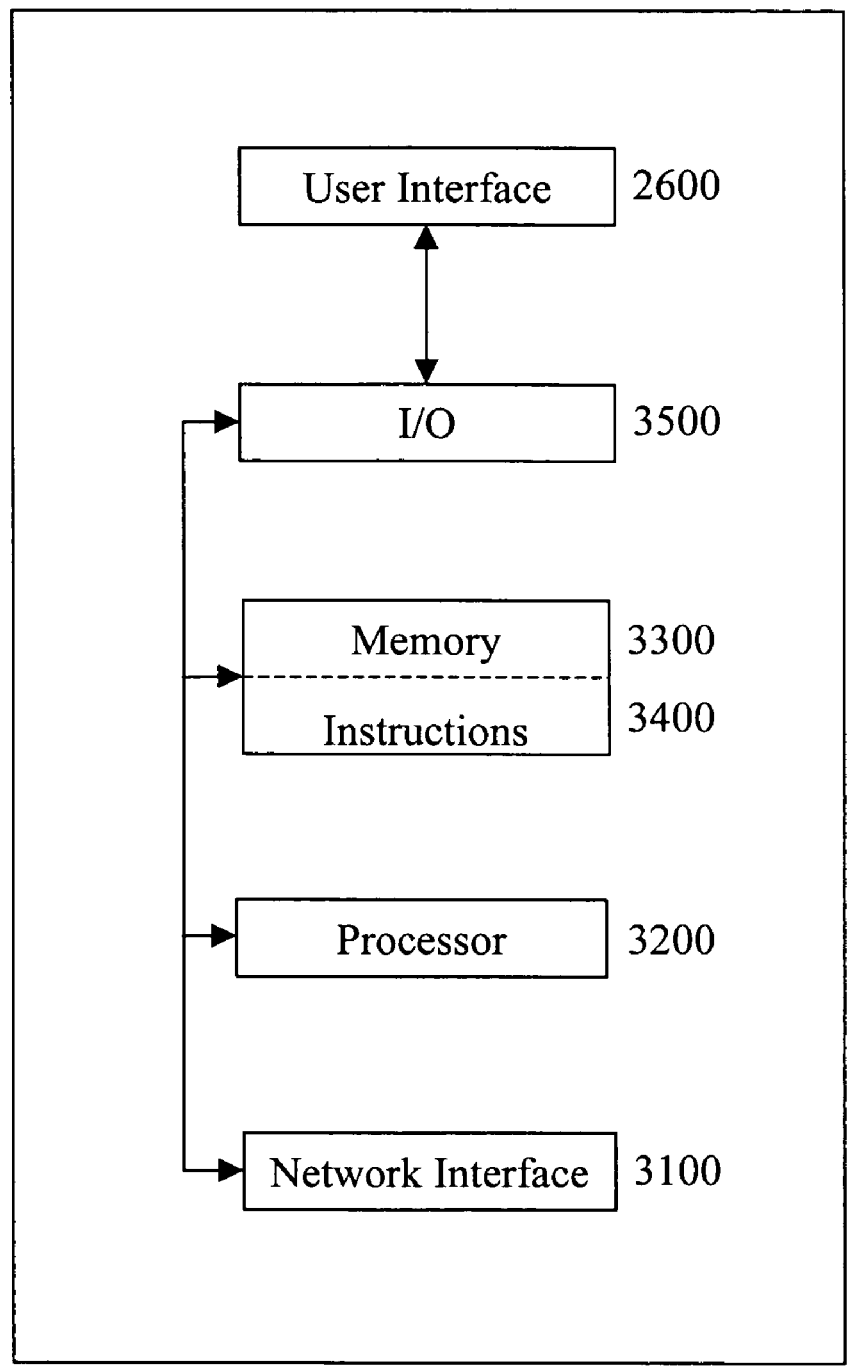
FIG. 3 is a block diagram of an exemplary embodiment of an information device 3000.

FIG. 3 is a block diagram of an exemplary embodiment of an information device 3000, which in certain operative embodiments can comprise, for example, display-comprising telephone 1100 and/or network node 1500 of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

In certain exemplary embodiments, via one or more user interfaces 3600, such as a graphical user interface, a user can view a display of data provided by a data server resident in a data network.

Figure 4:
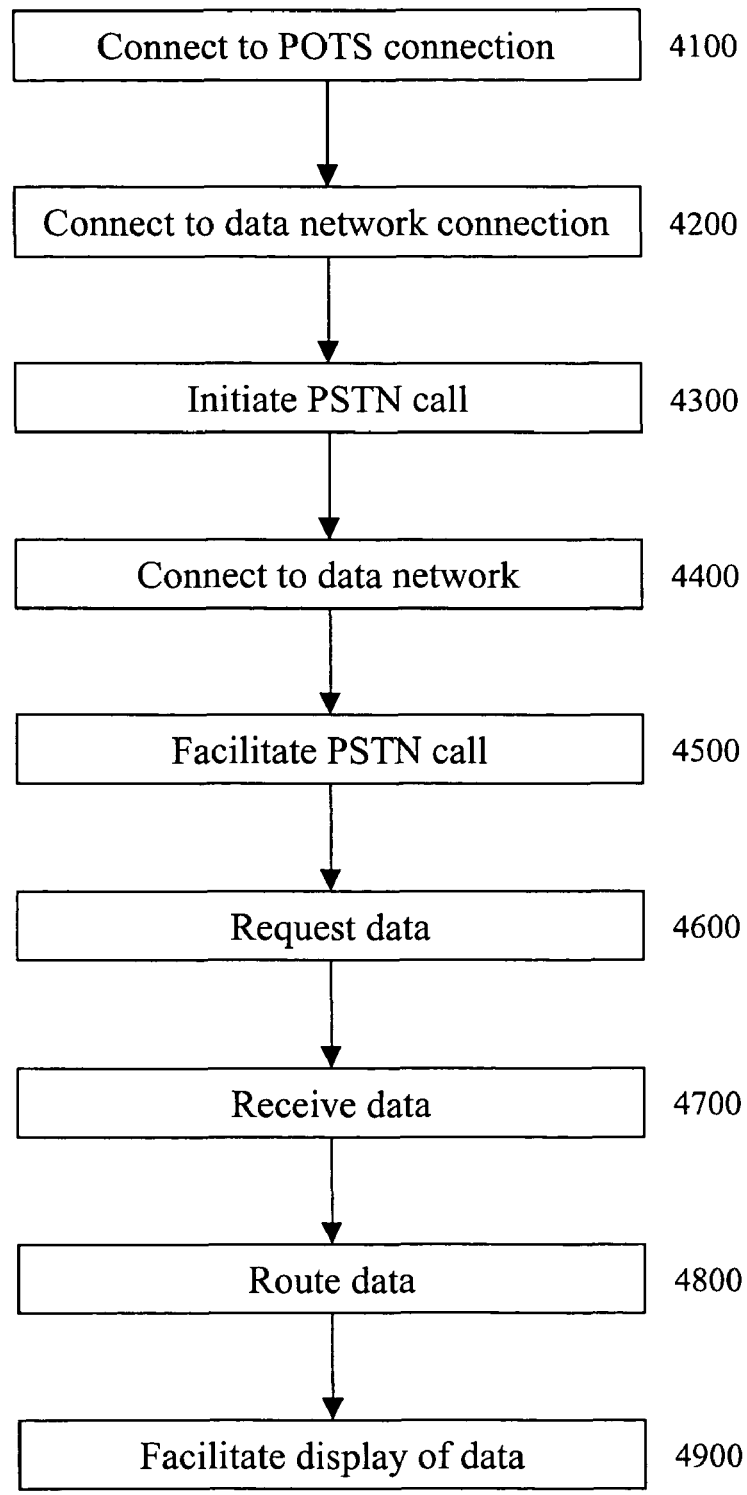
FIG. 4 is a flowchart of an exemplary embodiment of a method 4000.

FIG. 4 is a flowchart of an exemplary embodiment of a method 4000. At activity 4100, a display-comprising, dedicated purposes, corded or cordless, non-cellular, CPE telephony device can be connected to a POTS connection. At activity 4200, the CPE telephony device can be simultaneously connected to a data network connection. At activity 4300, based on user input, the CPE telephony device can initiate a PSTN telephone call. At activity 4400, the CPE telephony device can initiate a connection to a node within the data network. At activity 4500, the CPE telephony device can facilitate, for a user, a PSTN call. At activity 4600, the CPE telephony device can request data from a data network node, such as a data server resident within the data network. At activity 4700, the CPE telephony device can receive data from the data network and/or a data network node, such as a data server resident in the data network. At activity 4800, the CPE telephony device can route and/or transmit the data to a cordless handset. At activity 4900, the CPE telephony device can facilitate (e.g., via a cordless base station) the display of the data and/or display (e.g., via a cordless handset) the data.

Figure 5:
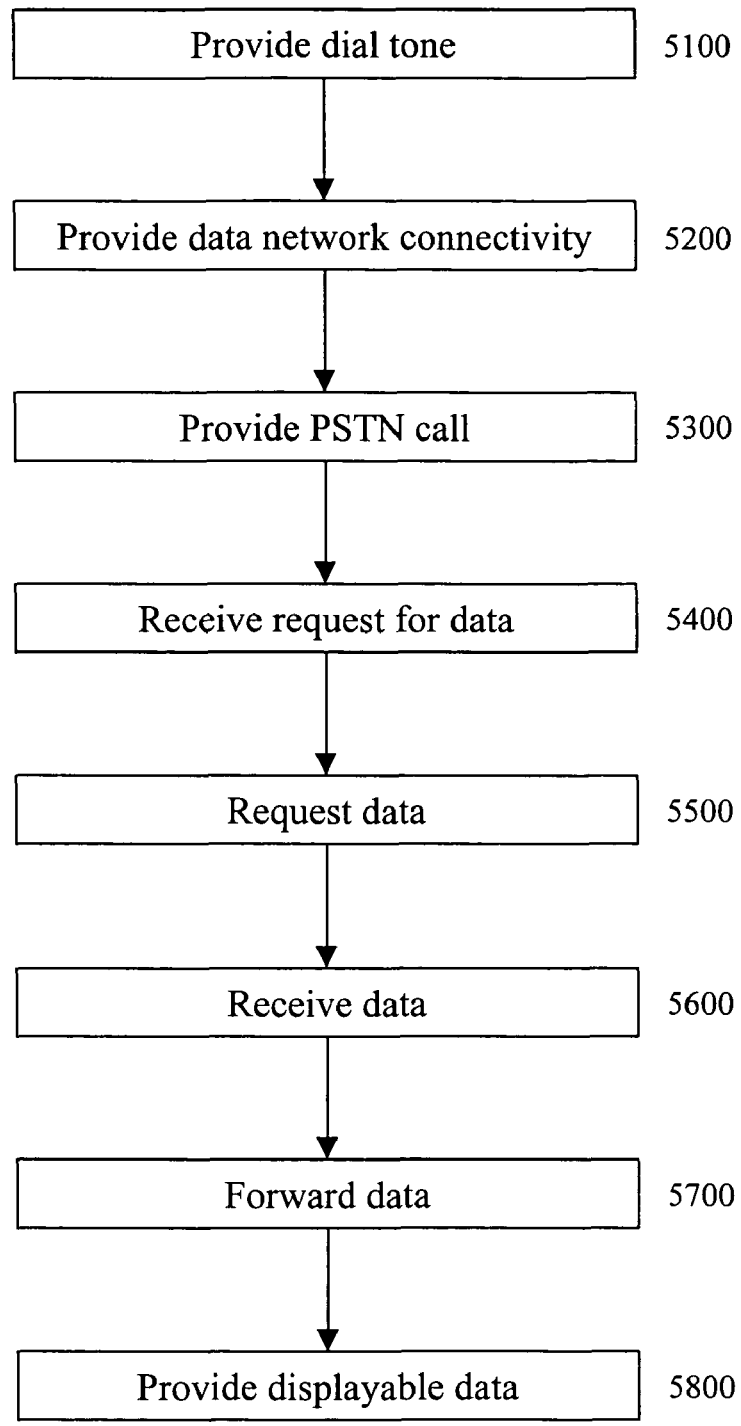
FIG. 5 is a flowchart of an exemplary embodiment of a method 5000.

FIG. 5 is a flowchart of an exemplary embodiment of a method 5000. At activity 5100, a CPE telephony device can be provided a dial tone by a PSTN and/or a telephony service provider. At activity 5200, a CPE telephony device can be provided data network connectivity, such as by a data network service provider (e.g., an internet service provider). At activity 5300, a CPE telephony device can be provided a call by a PSTN and/or a telephony service provider. At activity 5400, a data network can receive a request for data from a CPE telephony device. At activity 5500, the data network can request the data, such as from one or more data servers and/or one or more databases. At activity 5600, the data network can receive the data, such as from one or more data servers and/or one or more databases. At activity 5700, the data network can forward the data toward the CPE telephony device. At activity 5800, the data network can provide the requested data in a displayable format for a display-comprising, dedicated purposes, corded or cordless, non-cellular, CPE telephony device.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. An apparatus comprising:
   a dedicated purposes, non-cellular, CPE telephony device simultaneously connectable to a POTS connection and to a data network connection, the CPE telephony device adapted to:
   facilitate, via the POTS connection, a PSTN call to a call participant, and
   facilitate, via the data network connection a session through a data network over the PSTN, the CPE telephony device causing a display of data to the call participant of the PSTN call, the data being provided by a data server resident in the data network over the PSTN.

2. The apparatus of claim 1, wherein the CPE telephony device comprises a cordless base station.

3. The apparatus of claim 1, wherein the CPE telephony device comprises a cordless handset.

4. The apparatus of claim 1, wherein the CPE telephony device comprises a corded telephone.

5. The apparatus of claim 1, wherein the CPE telephony device comprises a display.

6. The apparatus of claim 1, wherein the CPE telephony device comprises a color display.

7. The apparatus of claim 1, wherein the information comprises textual data.

8. The apparatus of claim 1, wherein the information comprises graphical data.

9. The apparatus of claim 1, wherein the CPE telephony device receives the information in SMS format.

10. The apparatus of claim 1, wherein the data comprises directory services information.

11. The apparatus of claim 1, wherein the data comprises information selected from news information, sports information, financial information, weather information, and traffic information.

12. The apparatus of claim 1, wherein the data comprises promotional information.

13. The apparatus of claim 1, wherein the data comprises a photograph.

14. The apparatus of claim 1, wherein the data comprises a web page.

15. The apparatus of claim 1, wherein the data comprises a chat message.

16. The apparatus of claim 1, wherein the data comprises game information.

17. A method comprising a plurality of activities, comprising:
   via a dedicated purposes, non-cellular, CPE telephony device simultaneously connectable to a POTS connection and to a data network connection:
   facilitating, via the POTS connection, a PSTN call to a call participant, and
   facilitating, via the data network connection a session through a data network over the PSTN, the CPE telephony device causing a display of data to the call participant of the PSTN call, the data being provided by a data server resident in the data network over the PSTN.

18. The method of claim 17, further comprising, via the dedicated purposes, corded or cordless, non-cellular, CPE telephony device, receiving the data.

19. The method of claim 17, further comprising, via the dedicated purposes, corded or cordless, non-cellular, CPE telephony device, receiving the data during the PSTN call.

20. The method of claim 17, further comprising, via the dedicated purposes, corded or cordless, non-cellular, CPE telephony device, requesting the data.

21. The method of claim 17, further comprising, via the dedicated purposes, corded or cordless, non-cellular, CPE telephony device, requesting the data during the PSTN call.

22. A machine readable medium storing instructions for activities comprising:
   via a dedicated purposes, non-cellular, CPE telephony device simultaneously connectable to a POTS connection and to a data network connection:
   facilitating, via the POTS connection, a PSTN call to a call participant, and
   facilitating, via the data network connection a session through a data network over the PSTN, the CPE telephony device causing a display of data to the call participant of the PSTN call, the data being provided by a data server resident in the data network over the PSTN.

23. A method comprising a plurality of activities, comprising:

for a dedicated purposes, non-cellular, CPE telephony device simultaneously connected to a POTS connection and to a data network connection:

providing, via the POTS connection, a PSTN call to a call participant, and providing, via the data network connection, a session through a data network over the PSTN, the CPE telephony device causing a display of data to the call participant from a data server resident in the data network over the PSTN.

* * * * *